(12) United States Patent
Subbiah et al.

(10) Patent No.: US 10,938,746 B2
(45) Date of Patent: Mar. 2, 2021

(54) ADAPTIVE FIBRE CHANNEL SWITCH PORT ROLE CONFIGURATION SYSTEM

(71) Applicant: Dell Products L.P., Round Rock, TX (US)

(72) Inventors: Ramesh Kumar Subbiah, Tamil Nadu (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/439,479

(22) Filed: Jun. 12, 2019

(65) Prior Publication Data
US 2020/0396174 A1 Dec. 17, 2020

(51) Int. Cl.
*H04L 12/933* (2013.01)
(52) U.S. Cl.
CPC .................................. *H04L 49/15* (2013.01)
(58) Field of Classification Search
None
See application file for complete search history.

(56) References Cited

U.S. PATENT DOCUMENTS

| 2003/0218986 A1* | 11/2003 | DeSanti | H04Q 11/0005 370/250 |
| 2007/0002883 A1* | 1/2007 | Edsall | H04L 67/1034 370/422 |
| 2011/0255533 A1* | 10/2011 | Gnanasekaran | H04L 49/357 370/389 |
| 2015/0200803 A1* | 7/2015 | Kashyap | H04L 41/0668 370/217 |
| 2015/0358254 A1* | 12/2015 | Zheng | H04L 49/357 370/355 |
| 2017/0126543 A1* | 5/2017 | Wang | H04L 49/357 |
| 2017/0149695 A1* | 5/2017 | Shukla | H04L 61/6045 |

* cited by examiner

*Primary Examiner* — Hassan A Phillips
*Assistant Examiner* — Mohammed S Chowdhury
(74) *Attorney, Agent, or Firm* — Haynes and Boone, LLP

(57) ABSTRACT

An adaptive switch port role configuration system includes a first switch coupled to port on a second switch by an ISL, with end devices coupled to the second switch. The second switch transmits a port reconfiguration message to the first switch via the ISL while operating as a leaf switch with the port configured as an E port and, in response to an acceptance, performs link reset operations including reconfiguring the port as an N port. The second switch then transmits a FLOGI message for the port configured as the N port to the first switch via the ISL and, in response to an acceptance, transmits a respective FDISC message via the first ISL to the first switch for each of the end devices. The second switch then receives a response for each FDISC message, and uses end device addresses included in the responses to operate as an NPIV gateway.

17 Claims, 18 Drawing Sheets

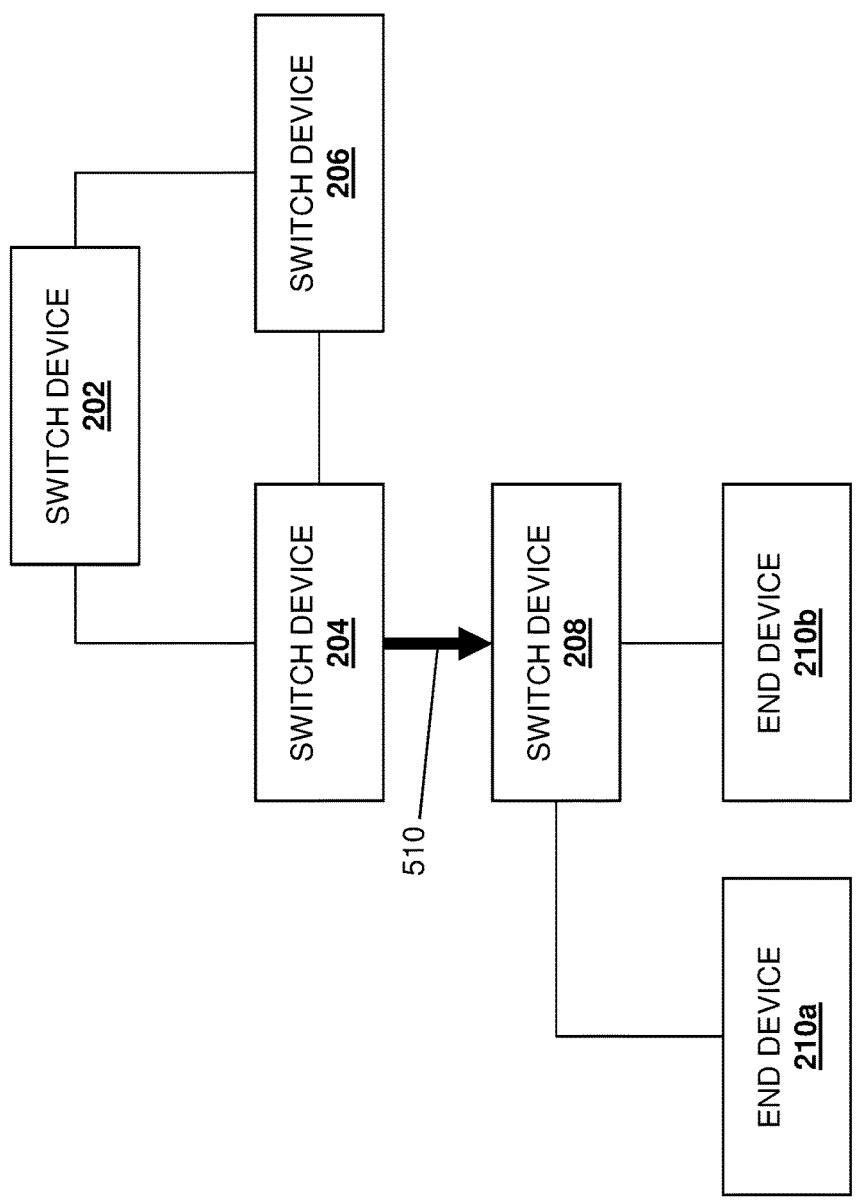

ADAPTIVE FIBRE CHANNEL SWITCH PORT ROLE CONFIGURATION SYSTEM

BACKGROUND

The present disclosure relates generally to information handling systems, and more particularly to adaptively configuring roles for ports in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, Fibre Channel (FC) switch devices, are often provided as part of a FC switching fabric that connects end devices (e.g., server devices, storage devices, etc.) together in order to enable communication between those end devices. However, particular FC switch device/end device topologies can lead to inefficiencies in the FC switching fabric. For example, in a FC switching fabric with multiple FC switch devices connected together by Inter-Switch Links (ISLs), some of the FC switch devices may include only a single ISL to the FC switching fabric, which configures those FC switch devices to operate as leaf switches. In such FC switching fabrics, the maintenance of any single ISL to an FC switch device acting as a leaf switch can be costly in terms of the amount of information (e.g., control information) that must transmitted over that single ISL during topology changes, configuration changes, and/or other FC switching fabric events known in the art, particularly considering that that single ISL is the only available link for data communications with the end devices connected to that FC switch device as well. As such, topology changes, configuration changes, and/or other FC switching fabric control events can overload the single ISL provided for FC switch devices in FC switch topologies that act as leaf switches, which can result in issues with providing data communications to the end devices connected to those FC switch devices.

Accordingly, it would be desirable to provide an adaptive FC switch device that avoids the issues discussed above.

SUMMARY

According to one embodiment, an Information Handling System (IHS) includes a processing system; and a memory system that is coupled to the processing system and that includes instructions that, when executed by the processing system, cause the processing system to provide a switch engine that is configured to: transmit, to a first switch device via a first ISL that is coupled to the processing system while operating as a leaf switch with a first port that is coupled to the processing system configured as an Extender port (E port), a first port reconfiguration message; perform, in response to receiving an acceptance of the first port reconfiguration message, link reset operations that include reconfiguring the first port as a Network port (N port); transmit, to the first switch device via the first ISL while the first port is configured as the N port, a first Fabric LOGIn (FLOGI) message for the first port configured as the N port; transmit, to the first switch device via the first ISL and in response to receiving an acceptance of the first FLOGI message, a respective Fabric DISCovery (FDISC) message for each of a plurality of end devices that are coupled to the processing system; receive, for each FDISC message, an FDISC message response; and operate, using end device addresses for each of the plurality of end devices included in the FDISC message responses, as an N_Port ID Virtualization (NPIV) gateway.

BRIEF DESCRIPTION OF THE DRAWINGS

FIG. 5F is a schematic view illustrating an embodiment of the adaptive switch port role configuration system of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
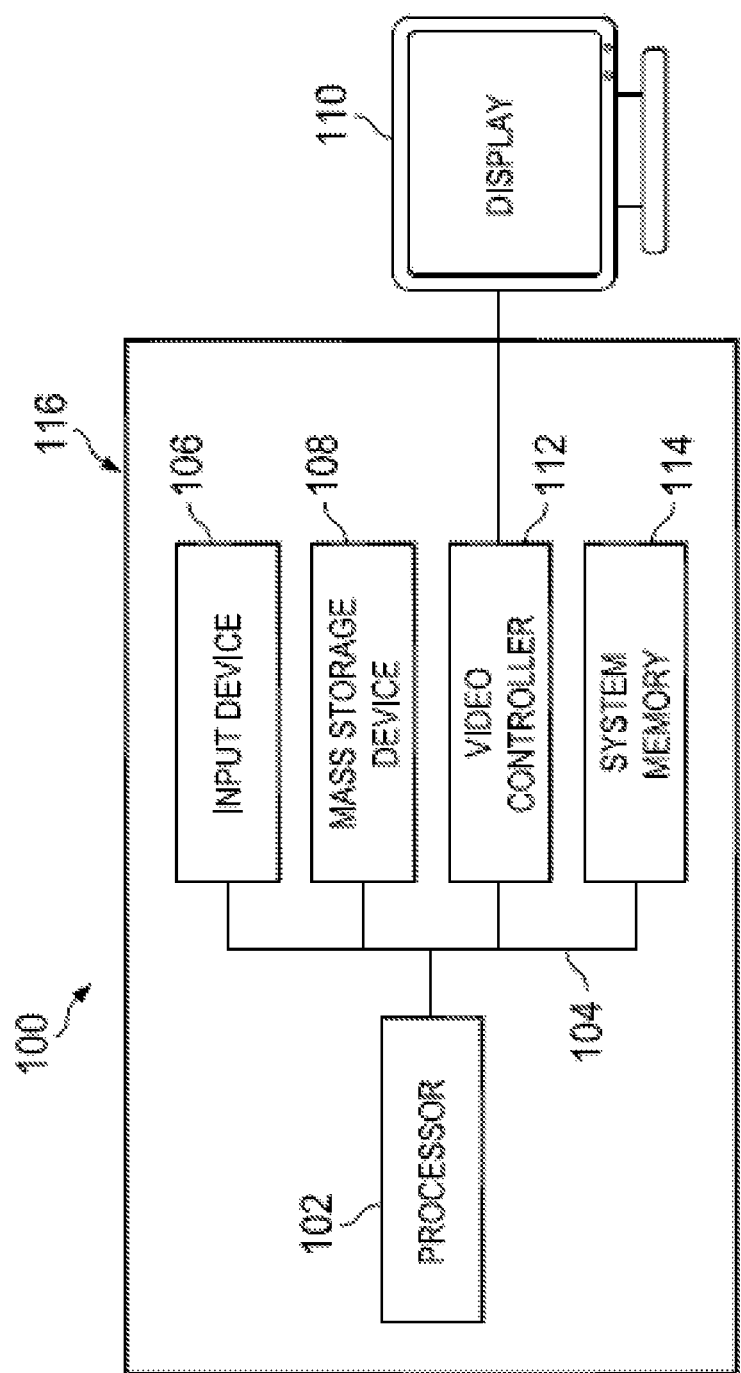
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
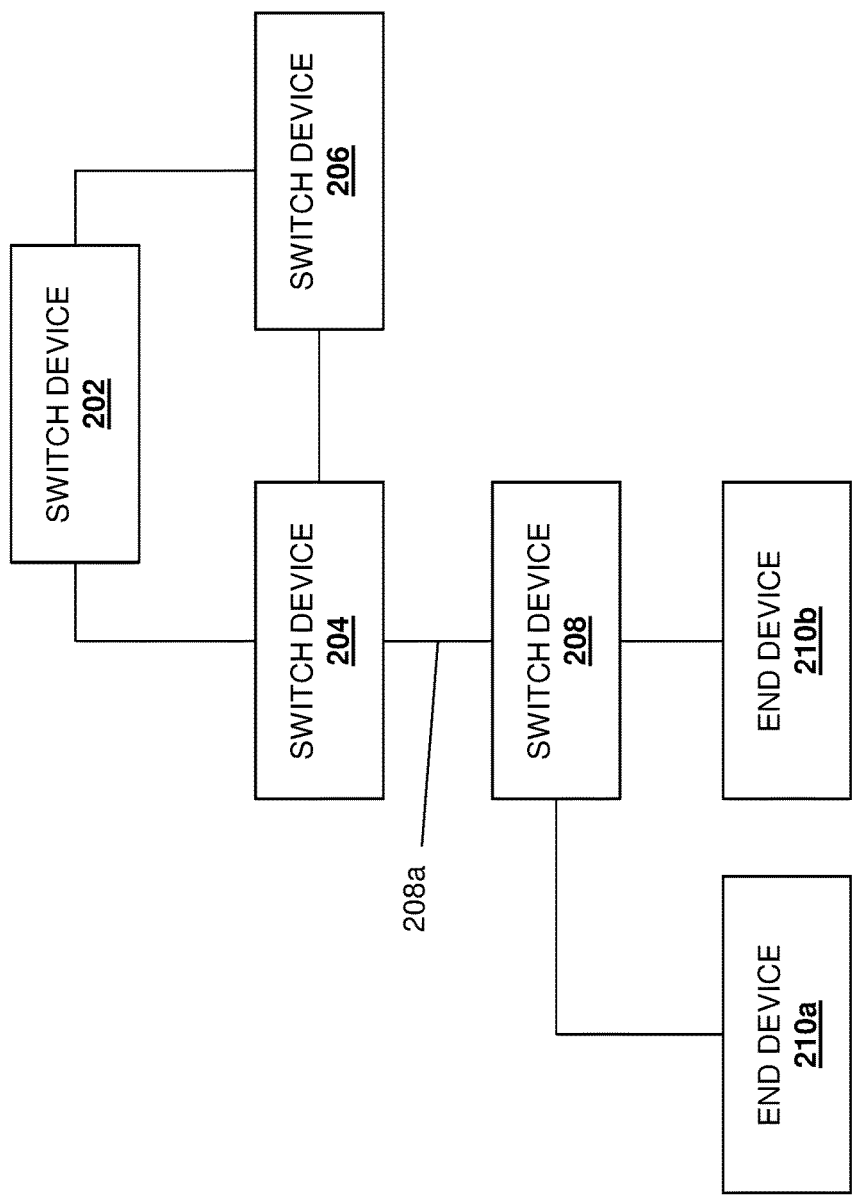
FIG. 2 is a schematic view illustrating an embodiment of an adaptive switch port role configuration system.

Referring now to FIG. 2, an embodiment of an adaptive switch port role configuration system 200 is illustrated. In the illustrated embodiment, the adaptive switch port role configuration system 200 includes a switch device 202 coupled by respective links to a switch device 204 and a switch device 206, with the switch device 204 coupled to the switch device 206 by a respective link as well. In an embodiment, any or all of the switch devices 202, 204, and 206 may be provided by the IHS 100 discussed above with reference to FIG. 1, and/or may include some or all of the components of the IHS 100. In the embodiments discussed below, the switch devices 202, 204, and 206 are described as Fibre Channel (FC) switch devices that operate as core switch device. However, while illustrated and discussed as FC switch devices operating as core switch devices, one of skill in the art in possession of the present disclosure will recognize that switch devices provided in the adaptive switch port role configuration system 200 may include any devices that may be configured to operate similarly as the switch devices 202, 204, and 206 discussed below.

In the illustrated embodiment, the adaptive switch port role configuration system 200 also includes a switch device 208 that is coupled by a link 208a to the switch device 204. Similarly as discussed above, in an embodiment, the switch device 208 may be provided by the IHS 100 discussed above with reference to FIG. 1, and/or may include some or all of the components of the IHS 100. In the embodiments discussed below, the switch device 208 is described as Fibre Channel (FC) switch device that may adaptively operate as a leaf switch, an NPIV gateway, and a core switch depending on the FC switching fabric topology. However, while illustrated and discussed as FC switch devices operating as a leaf switch, an NPIV gateway, and a core switch depending on the FC switching fabric topology, one of skill in the art in possession of the present disclosure will recognize that switch devices provided in the adaptive switch port role configuration system 200 may include any devices that may be configured to operate similarly as the switch device 208 discussed below.

In the illustrated embodiment, the switch device 208 is coupled to a plurality to end devices that include end device 210a and end device 210b. In an embodiment, any or all of the end devices 210a and 210b may be provided by the IHS 100 discussed above with reference to FIG. 1, and/or may include some or all of the components of the IHS 100, and in specific examples may include server devices, storage devices, and/or any other devices that would be apparent to one of skill in the art in possession of the present disclosure. One of skill in the art in possession of the present disclosure will appreciate that the switch devices 202, 204, 206, and 208 (as well as any other switch devices included in the adaptive switch port role configuration system 200) may provide a switching fabric (e.g., an FC switching fabric) that couples together end devices to provide for the transmission of data between those end devices. As such, other end devices may (and typically will) be coupled to any of the switch devices (e.g., the switch device 202, the switch device 206, etc.) and/or the switching fabric (e.g., as part of a datacenter, connected to a datacenter, etc.) while remaining within the scope of the present disclosure. While a specific adaptive switch port role configuration system 200 has been illustrated and described, one of skill in the art in possession of the present disclosure will recognize that the adaptive switch port role configuration system of the present disclosure may include a variety of components and component configurations while remaining within the scope of the present disclosure as well.

Figure 3:
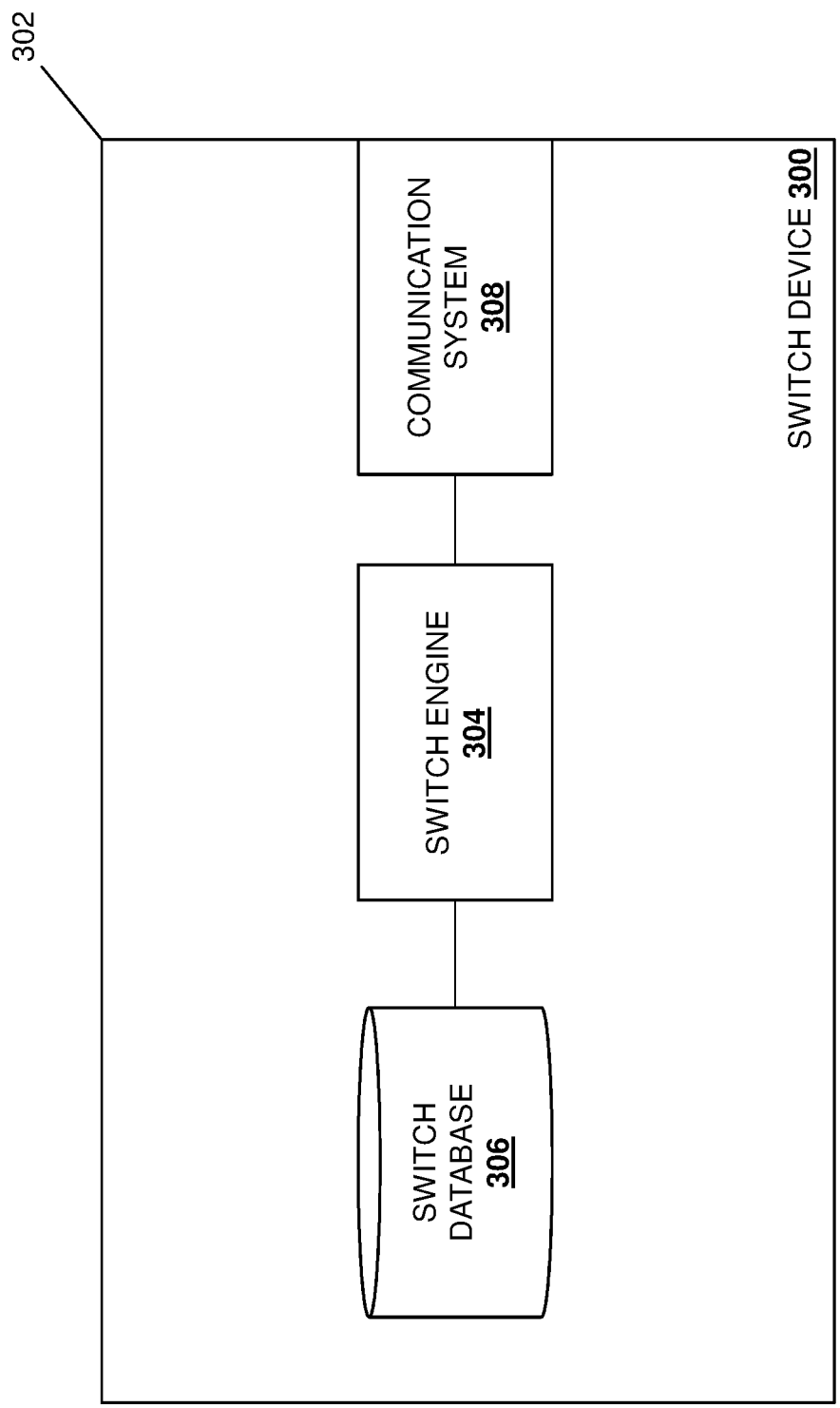
FIG. 3 is a schematic view illustrating an embodiment of a switch device included in the adaptive switch port role configuration system of FIG. 2.

Referring now to FIG. 3, an embodiment of a switch device 300 is illustrated that may provide any of the switch devices 202, 204, 206, and 208 discussed above with reference to FIG. 2. As such, the switch device 300 may be provided by the IHS 100 discussed above with reference to FIG. 1 and/or may include some or all of the components of the IHS 100, and in specific embodiments may include a FC switch device that operates as a core switch, an FC switch device that is configured to adaptively operate as a leaf switch, an NPIV gateway, and a core switch depending on the FC switching fabric topology, etc. Furthermore, while illustrated and discussed as an FC switch device, one of skill in the art in possession of the present disclosure will recognize that the functionality of the switch device 300 discussed below may be provided by other devices that are configured to operate similarly as the switch device 300 discussed below. In the illustrated embodiment, the switch device 300 includes a chassis 302 that houses the components of the switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switch engine 304 that is configured to perform the functionality of the switch engines and/or switch devices discussed below.

The chassis 302 may also house a storage system (not illustrated, but which may include the storage 108 discussed above with reference to FIG. 1) that is coupled to the switch engine 304 (e.g., via a coupling between the storage system and the processing system) and that includes a switch database 306 that is configured to store any of the information utilized by the switch engine 304 discussed below. The chassis 302 may also house a communication system 308 that is coupled to the switch engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. For example, the communication system 308 in the switch device 300 may include any of the ports discussed below (e.g., the ports connected to the links and/or ISLs discussed below, as well as any other links that would be apparent to one of skill in the art in possession of the present disclosure). While a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
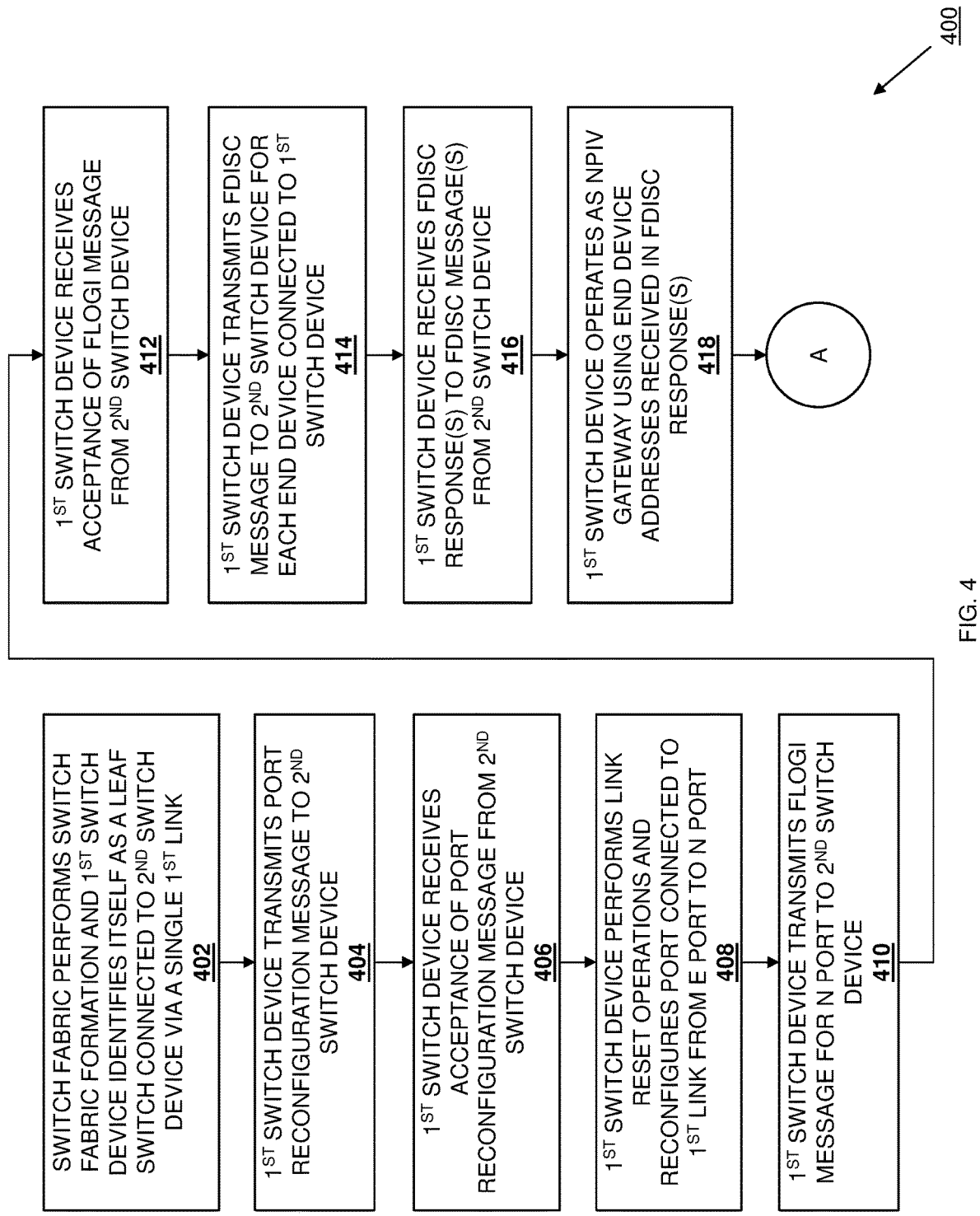
FIG. 4 is a flow chart illustrating an embodiment of a method for adaptively configuring switch port roles.

Referring now to FIG. 4, an embodiment of a method 400 for adaptively configuring switch port roles is illustrated. As discussed below, the systems and methods of the present disclosure provide for the adaptive transitioning of port roles for ports on a switch device in a manner that moves routing and fabric functionality out of switch devices configured as leaf switches and to switch devices configured as core switches, which eliminates the need to perform costly ISL operations and ISL maintenance via E ports on switch devices operating a leaf switches. This may be accomplished by having a first switch device that it is configured as a leaf switch based on it being connected via a single ISL to a second switch device operating as a core switch and, in response, inform that second switch device about a transition of its E port connected to that ISL to an N port. In response the second switch device accepting the transition, the first and second switch devices will perform link reset operations that include the first switch device reconfiguring its E port connected to the ISL to an N port, and sending a FLOGI message to the second switch device for that N port. In response to receiving an acceptance to the FLOGI message from that second switch device, the first switch device sends an FDISC message for each end device connected to the first switch device, and may receive back responses to the FDISC messages that include end device addresses for those end devices. The first switch device may then operate as an NPIV gateway using those end device addresses, which allows the switch fabric to view the end devices connected to the first switch device as being directly connected to the second switch device, thus providing for the processing of control information by the second switch device.

In the event a new link becomes available to the first switch device, it will come up on an N port and the first switch device will send a FLOGI message on that new link for the N port. If no response to the FLOGI message is received, the first switch device will determine that the new link is coupled to an end device, and will reconfigure the N port to an F port. However, if a response to the FLOGI message is received, the first switch device will determine whether the new link is connected to the second switch device or a new third switch device. If the new link is connected to the second switch device, the first switch device aggregates the new link with the existing link. If the new link is connected to a new third switch device, the first and third switch device perform link reset operations that include the first switch device reconfiguring the N port to an E port and attempting to verify a preferred domain identifier. If the preferred domain identifier is verified, the first switch device may complete zone merge operations, while if the preferred domain identifier is not verified, the first switch device may select a disruptive build fabric or may isolate the E port. In either case, following zone merge operations, traffic may be routed via the E port, and link reset operations may be performed on existing N ports will reconfigure those N ports as E ports as well. As such, the first switch device will now be configured with two ISLs to different switch devices such that the first switch device no longer operates as a leaf switch. Thus, ports on a switch device may be adaptively transitioned between E ports and N ports based on the role of that switch device in the switching fabric/switch topology, with the ability to perform non-disruptive N port to E port transitions.

The method 400 begins at block 402 where a switch fabric performs a switch fabric formation and a first switch device in the switch fabric identifies itself as a leaf switch connected to a second switch device via a single first link. In an embodiment, at block 402, the adaptive switch port role configuration system 200 may be provided as illustrated in FIG. 2, and the switch devices and end devices may be initialized, which one of skill in the art in possession of the present disclosure will recognize will result in the switch fabric performing a variety of conventional fabric formation operations known in the art. For example, conventional fabric formation operations performed by the switch engine 304 on the port in the communication system 308 that is included in the switch device 208/300 and connected to the link 208a may cause that port to be configured as an Extender port (E port). Furthermore, the switch engine 304 in the switch device 208/300 may also assign addresses to the end devices 210a and 210b (e.g., an end device address "04:02:00" to end device 210a, and an end device address "04"03"00" to end device 210b) during those conventional fabric formation operations. However, while a few examples of conventional fabric formation operations have been described, one of skill in the art in possession of the present disclosure will recognize that a variety of fabric formation operations may be performed at block 402 while remaining within the scope of the present disclosure as well. In an embodiment of block 402 and following the fabric formation operations, the switch engine 304 in the switch device 208/300 may identify that only a single link (the link 208a providing an Inter-Switch Link (ISL) in this embodiment) is available for the switch device 208 to the switch fabric and, in response, may determine that the switch device 208 is configured as a leaf switch (i.e., a switch device in the switch fabric that only includes a single ISL or ISL trunk to the switch fabric, as opposed to core switches that include more than one ISL or ISL trunk.)

Figure 5A:
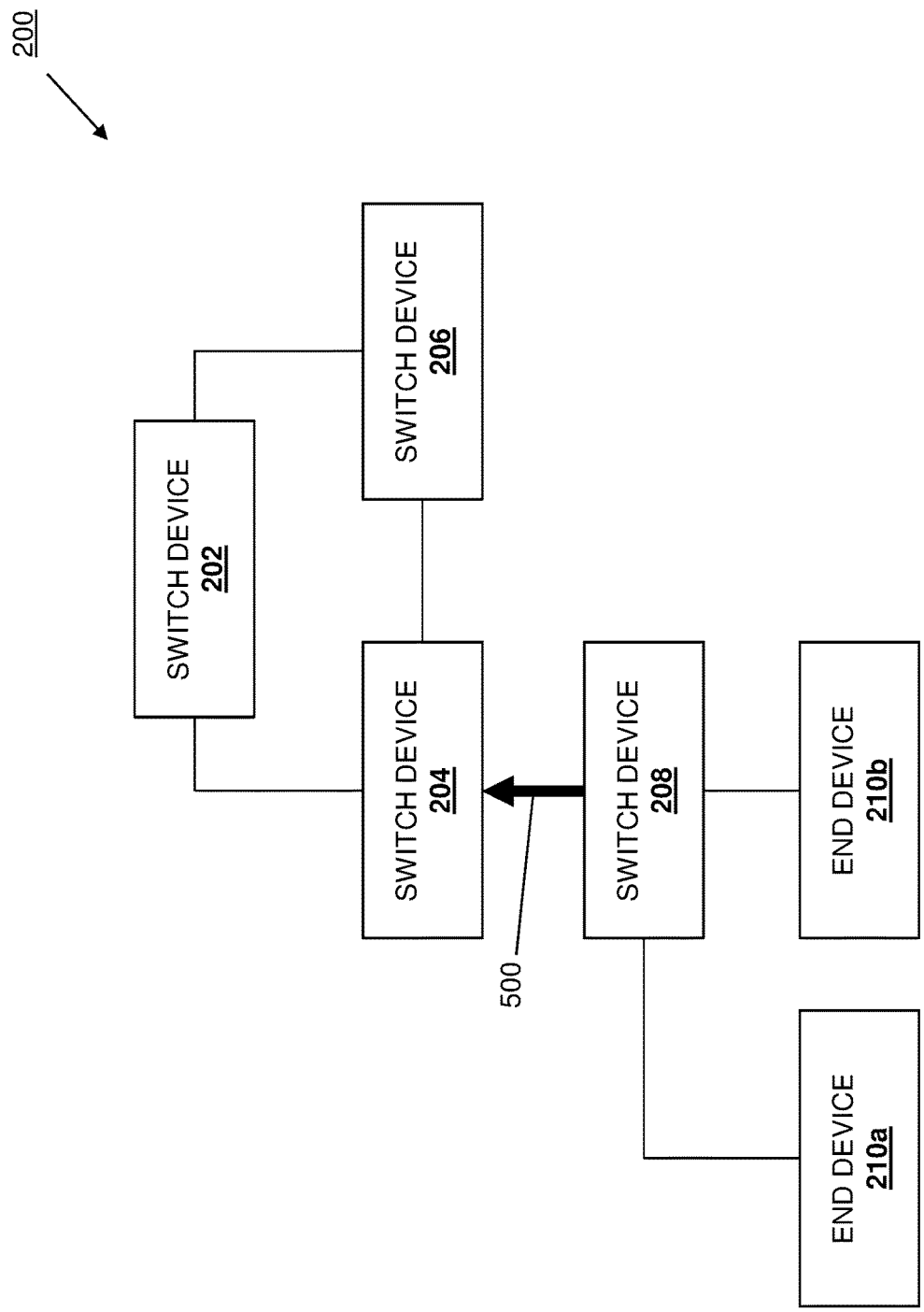
FIG. 5A is a schematic view illustrating an embodiment of the adaptive switch port role configuration system of FIG. 2 operating during the method of FIG. 4.

The method 400 then proceeds to block 404 where the first switch device transmits a port reconfiguration message to the second switch device. With reference to FIG. 5A, in an embodiment of block 404 and in response to determining that the switch device 208 is configured as a leaf switch, the switch engine 304 in the switch device 208/300 may generate an Extended Link Service (ELS) message 500 that provides a port reconfiguration message that is configured to inform the switch device 204 that it intends to reconfigure its port connected to the link 208a from an E port to a Network port (N port), and may transmit that ELS message 500 via the link 208a to the switch device 204. In an embodiment, the ELS message 500 that provides the port reconfiguration message at block 404 may identify the link 208a, the port connected to the link 208a, the current role assigned to that port (e.g., an E port in this example), the proposed reconfigured role of the that port (e.g., an N port in this example), and/or a variety of other ELS/port reconfiguration information that would be apparent to one of skill in the art in possession of the present disclosure. As such, at block 404, the switch engine 304 in the switch device 204/300 may receive the ELS/port reconfiguration message 500 from the switch device 208 via its communication system 308, and determine whether to accept that port reconfiguration. While the example of the method 400 below assumes that the switch device 204/300 accepts the port reconfiguration, one of skill in the art in possession of the present disclosure will recognize that the port reconfiguration may be denied by the switch device 204/300 when the switch device 204/300 does not support this functionality, when resource are unavailable (e.g., in a busy fabric scenario), and/or in a variety of other situations known in the art.

Figure 5B:
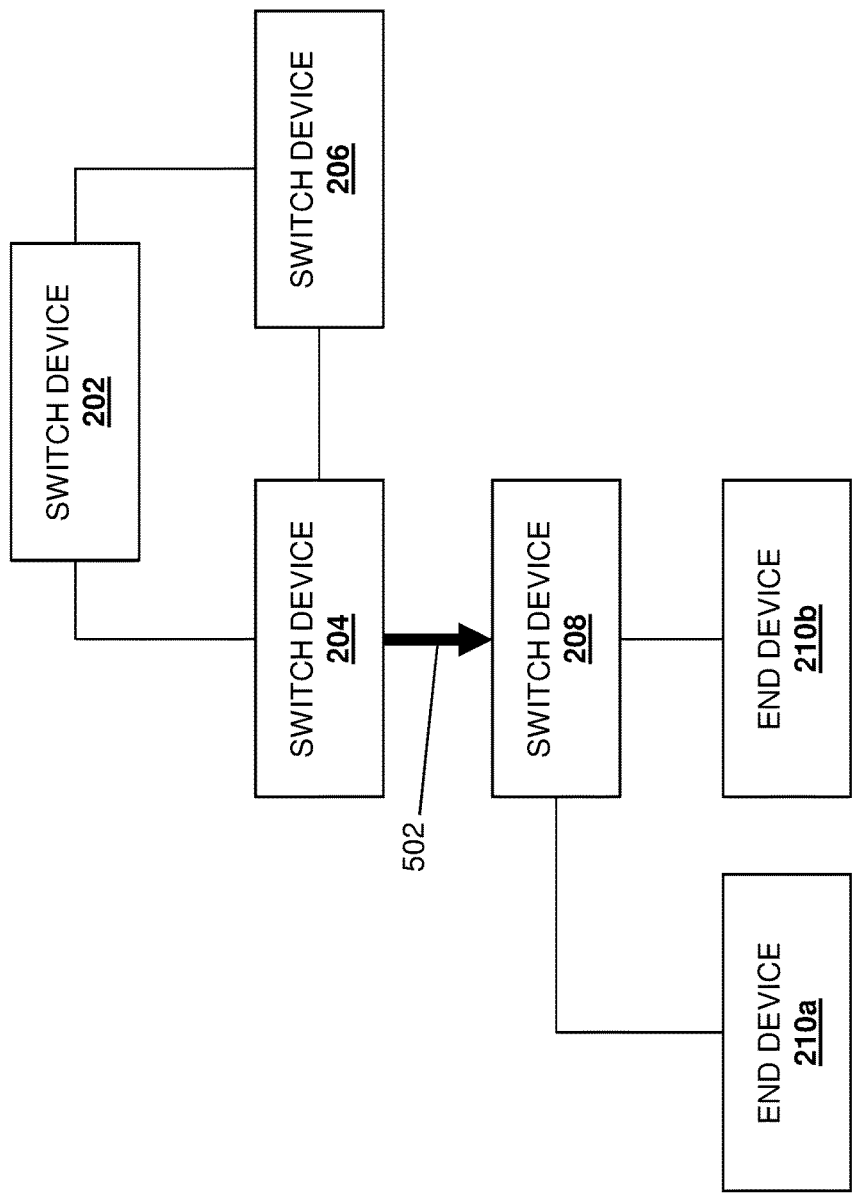
FIG. 5B is a schematic view illustrating an embodiment of the adaptive switch port role configuration system of FIG. 2 operating during the method of FIG. 4.

The method 400 then proceeds to block 406 where the first switch device receives an acceptance of the port reconfiguration message from the second switch device. With reference to FIG. 5B, in an embodiment of block 406, the switch engine 304 in the switch device 204/300 may decide to accept the port reconfiguration proposed in the ELS/port reconfiguration message received from the switch device 208 at block 404 and, in response, may generate and transmit a port reconfiguration acceptance 502 via its communication system 308 and to the switch device 208. As such, at block 406, the switch engine 304 in the switch device 208/300 may receive the port reconfiguration acceptance 502 from the switch device 204 via its communication system 308.

The method 400 then proceeds to block 408 where the first switch device begins link reset operations and reconfigures the port connected to the first link from an E port to an N port. In an embodiment, at block 408 and in response to the switch device 204 accepting the port reconfiguration proposed by the switch device 204, the switch devices 204 and 208 may perform link reset operations for the link 208a. For example, the switch engine 304 in the switch device 208/300 may perform link reset operations that include reconfiguring the port in its communication system 308 that is connected to the link 208a from an E port to an N port. As would be understood by one of skill in the art in possession of the present disclosure, the reconfiguration of a port from an E port to an N port may include the switch engine 304 resetting the link via a primitive sequence (e.g., in a Link Recovery State (LR), a Link Reset Response Sequence (LRR), an Offline Sequence (OLS), and a Not Operational Sequence (NOS), followed by an idle signal) and allowing a new port role to be assigned upon successful completion of FLOGI operations, and/or performing a variety of other actions known in the art. Furthermore, the performance of the link reset operations by the switch engine 304 in the switch device 204/300 may include reconfiguring the port in its communication system 308 that is connected to the link 208a from an E port to a Fabric port (F port), as well as the switch engine 304 in the switch device 204/300 operating to main records in its switch database 306 of the port that was reconfigured from an E port to an F port, as well as details about the switch device 208 that caused that reconfiguration (e.g., a World Wide Name (WWN) of the switch device 208, any domain identifier reserved by the switch device 208 (discussed below), a WWN of the requested port, and/or any other information that would be apparent to one of skill in the art in possession of the present disclosure.)

Figure 5C:
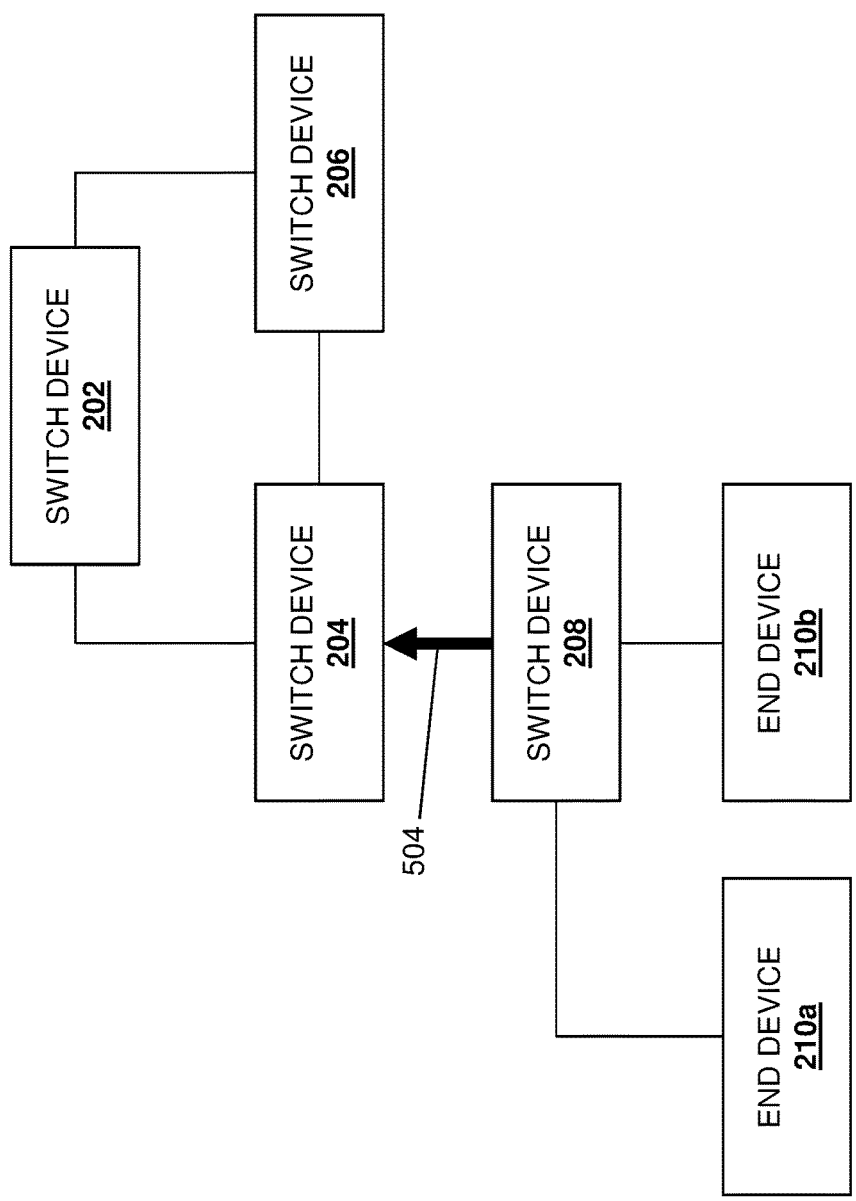
FIG. 5C is a schematic view illustrating an embodiment of the adaptive switch port role configuration system of FIG. 2 operating during the method of FIG. 4.

The method 400 then proceeds to block 410 where the first switch device transmits a FLOGI message for the N port to the second switch device. As illustrated in FIG. 5C, in an embodiment of block 410, the switch engine 304 in the switch device 208/300 may operate to generate and transmit a Fabric LOGIn (FLOGI) message 504 via its communication system 308 and to the switch device 204. For example, one of skill in the art in possession of the present disclosure will recognize that, as part of the link reset operations begun at block 408, the switch engine 304 in the switch device 208/300 may initiate the FLOGI message 504 on the port that is connected to the link 208a and that was reconfigured from an E port to an N port at block 408. As will be appreciated by one of skill in the art in possession of the present disclosure, in some embodiments, the initiation of the FLOGI message 504 by the switch device 208 for its port connected to the link 208a may provide for the reservation of a domain identifier which, as discussed in further detail below, may be subsequently utilized to provide non-disruptive switch fabric topology changes. As discussed below, in situations where the domain identifier is not reserved, any associated port may be isolated. As such, at block 410, the switch engine 304 in the switch device 204/300 may receive the FLOGI message 504 from the switch device 208 via its communication system 308. As will be appreciated by one of skill in the art in possession of the present disclosure, in response to receiving FLOGI messages, the switch engine 304 in the switch device 204/300 may convert the associated port to an F port after a link reset sequence and may utilize the F port in responding to the FLOGI message received, and allocate any needed resources (e.g., fabric controller resources, directory service resources, etc.)

Figure 5D:
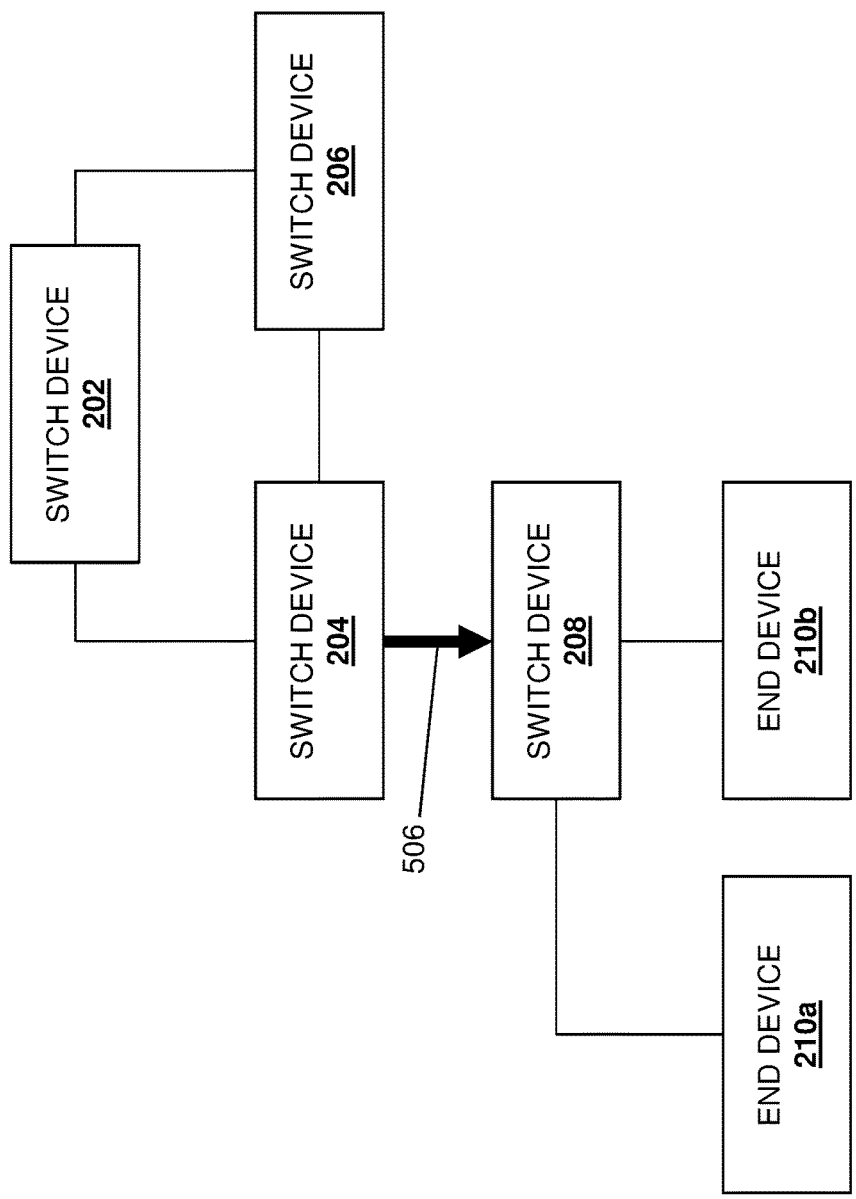
FIG. 5D is a schematic view illustrating an embodiment of the adaptive switch port role configuration system of FIG. 2 operating during the method of FIG. 4.

The method 400 then proceeds to block 412 where the first switch device receives an acceptance of the FLOGI message from the second switch device. With reference to FIG. 5D, in an embodiment of block 412, the switch engine 304 in the switch device 204/300 may decide to accept the FLOGI message 504 received from the switch device 208 at block 410 and, in response, may generate and transmit a FLOGI acceptance 506 via its communication system 308 and to the switch device 208. As such, at block 412, the switch engine 304 in the switch device 208/300 may receive the FLOGI acceptance 506 from the switch device 204 via its communication system 308.

Figure 5E:
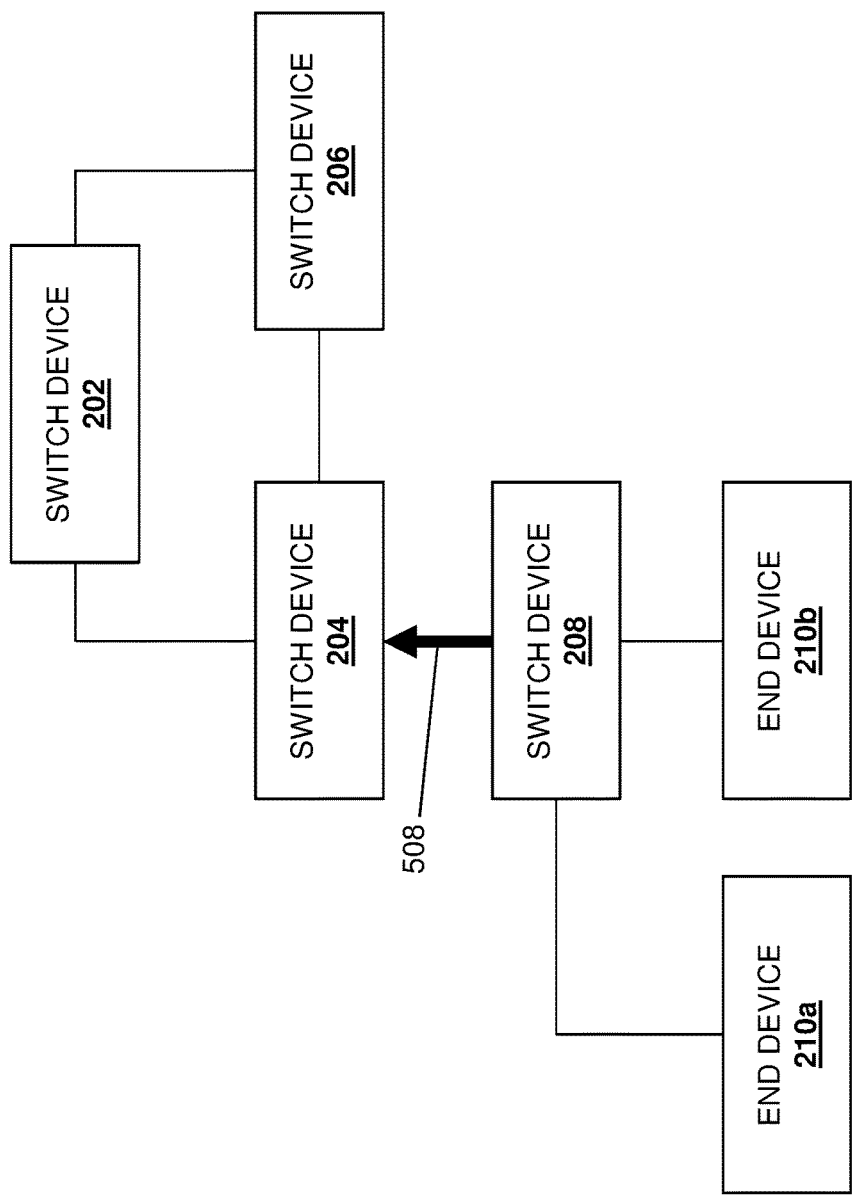
FIG. 5E is a schematic view illustrating an embodiment of the adaptive switch port role configuration system of FIG. 2 operating during the method of FIG. 4.

The method 400 then proceeds to block 414 where the first switch device transmits an FDISC message to the second switch device for each end device connected to the first switch device. With reference to FIG. 5E, in an embodiment of block 414 and in response to receiving the FLOGI acceptance 506 from the switch device 204 at block 412, the switch engine 304 in the switch device 208/300 may operate to transmit a respective Fabric DISCovery (FDISC) message 508 via its communication system 308 and to the switch device 204 for each of the end devices 210a and 210b. As such, at block 414, the switch engine 304 in the switch device 204/300 may receive a respective FDISC message 508 for each of the end devices 210a and 210b from the switch device 204 via its communication system 308. As will be appreciated by one of skill in the art in possession of the present disclosure, in response to receiving FDISC messages, the switch engine 304 in the switch device 204/300 may convert the associated port to an F port after a link reset sequence and may utilize the F port in responding to the FLOGI message received, and allocate any needed resources (e.g., fabric controller resources, directory service resources, etc.).

The method 400 then proceeds to block 416 where the first switch device receives FDISC response(s) to the FDISC message(s) from the second switch device. With reference to FIG. 5F, in an embodiment of block 416, the switch engine 304 in the switch device 204/300 may decide to accept the respective FDISC message 508 received from the switch device 208 for each of the end devices 210a and 210b at block 414 and, in response, may generate and transmit a respective FDISC response 510 via its communication system 308 and to the switch device 208 for each respective FDISC message 508 that was received. As will be appreciated by one of skill in the art in possession of the present disclosure, FDISC responses sent in response to FDISC messages may include end device addresses for each end device for which an FDISC message was sent. For example, the FDSIC response sent by the switch device 204 for the end device 210a may include an end device address "01:03:01" (e.g., including a domain identifier "01" for the switch device 204), while the FDSIC response sent by the switch device 204 for the end device 210b may include an end device address "01:03:02" (e.g., including the domain identifier "01" for the switch device 204). As such, at block 416, the switch engine 304 in the switch device 208/300 may receive the respective FDISC response 510 from the switch device 204 via its communication system 308 for each of the end devices 210a and 210b.

The method 400 then proceeds to block 418 where the first switch device operates as an NPIV gateway using end device addresses received in the FDISC response(s). In an embodiment, at block 418 and following the receiving of the respective FDISC responses for each of the end devices 210a and 210b from the switch device 204, the switch engine 304 in the switch device 208/300 may operate as an N_Port Identifier Virtualization (NPIV) gateway using the end device addresses received in the respective FDISC response(s). For example, in response to receiving the FDSIC response sent by the switch device 204 for the end device 210a that includes the end device address "01:03:01", the switch engine 304 in the switch device 208/300 may utilize the end device address "01:03:01" (i.e., including the domain identifier "01" for the switch device 204) for the end device 210a in place of the end device address "04:02:00" (i.e., including the domain identifier "04" for the switch device 208) it originally assigned to the end device 210a. Similarly, in response to receiving the FDSIC response sent by the switch device 204 for the end device 210b that includes the end device address "01:03:02", the switch engine 304 in the switch device 208/300 may utilize the end device address "01:03:02" (i.e., including the domain identifier "01" for the switch device 204) for the end device 210b in place of the end device address "04:03:00" (i.e., including the domain identifier "04" for the switch device 208) it originally assigned to the end device 210b.

As will be appreciated by one of skill in the art in possession of the present disclosure, the reconfiguration of the port on the switch device 208 connected to the link 208a as an N port, and the use of the end device addresses for the end devices 210a and 210b with the domain identifier for the switch device 204, will cause the switch device 208 that is configured as a leaf switch to operate as an NPIV gateway such that, from the perspective of the switch fabric, the end devices 210a and 210b appear to be directly connected to the switch device 204. Thus, the switch device 208 operating as an NPIV gateway will not process control traffic, as control traffic processing will be performed by core switch devices (e.g., the switch device 204), eliminating the need for the switch device 208 to perform the costly E port ISL operations and maintenance that it would otherwise need to perform in the event of topology or configuration changes.

Figure 6:
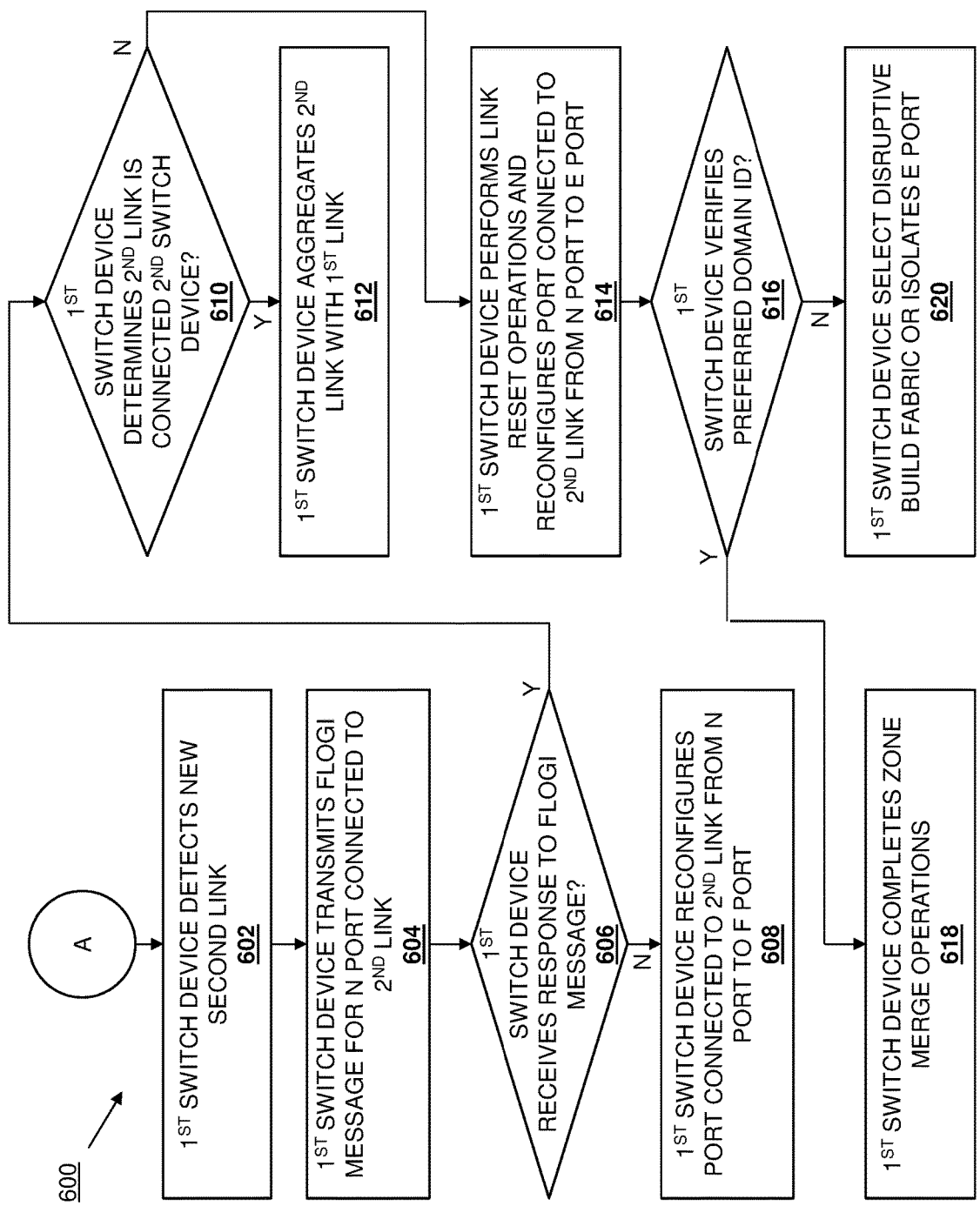
FIG. 6 is a flow chart illustrating an embodiment of a method for adaptively configuring switch port roles.
Figure 7A:
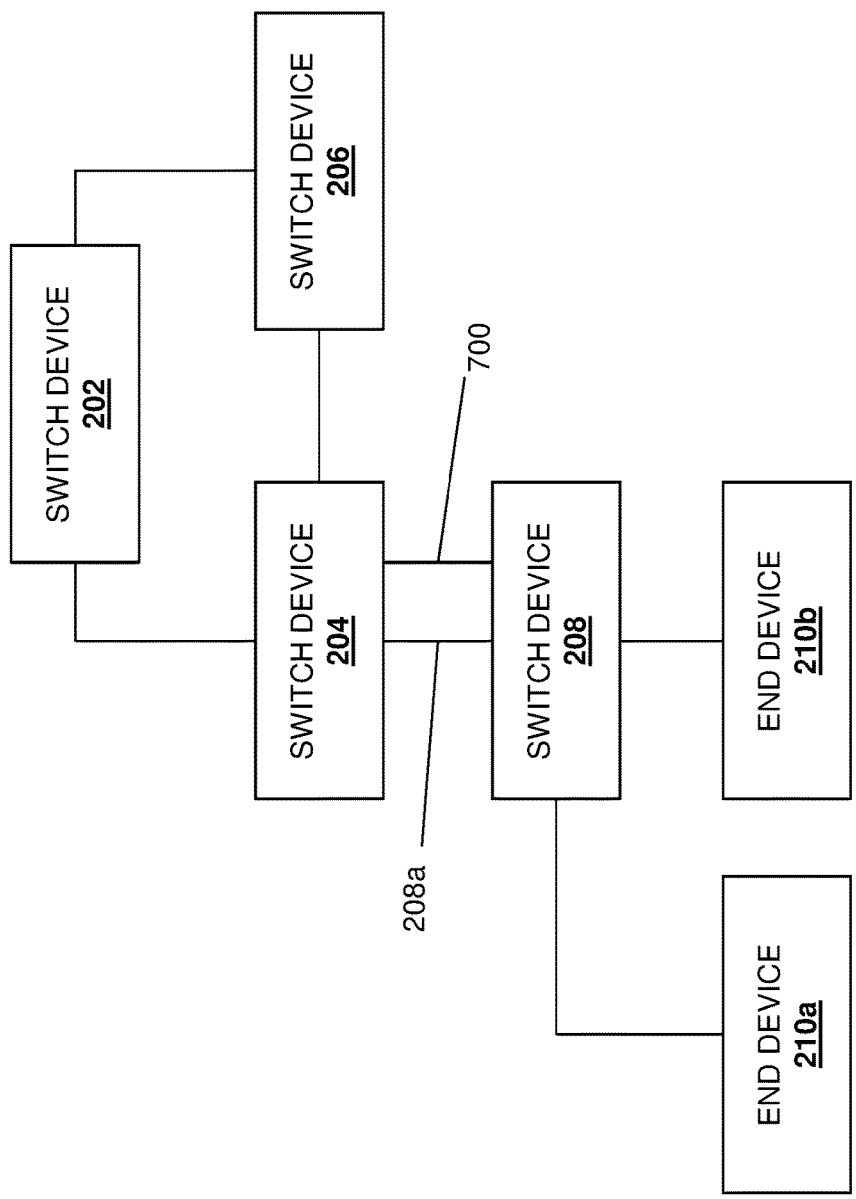
FIG. 7A is a schematic view illustrating an embodiment of the adaptive switch port role configuration system of FIG. 2 operating during the method of FIG. 6.
Figure 8A:
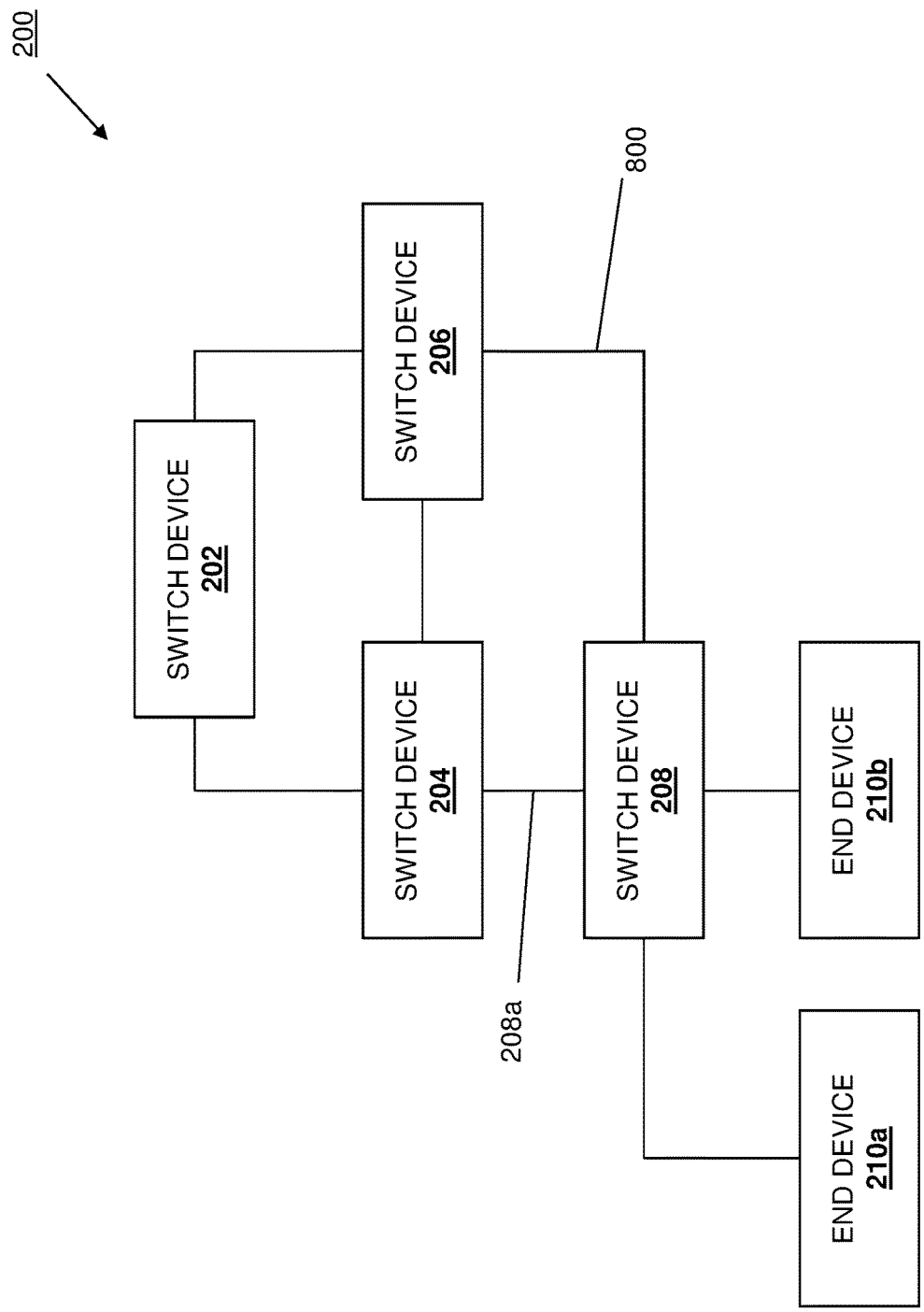
FIG. 8A is a schematic view illustrating an embodiment of the adaptive switch port role configuration system of FIG. 2 operating during the method of FIG. 6.

With reference to FIG. 6, following block 418, the method 400 may then proceed to the method 600. The method 600 begins at block 602 when the first switch device detects a new second link. With reference to FIG. 7A, in some embodiments of block 602 and following the switch device 208 being configured to operate as an NPIV gateway according to the method 400, a link 700 may be provided between the switch device 204 and the switch device 208 (e.g., in addition to the link 208a discussed above). As such, at block 602, the switch engine 304 in the switch device 208 may identify the availability of the link 700 via a port in its communication system 308 that is connected to the link 700, which one of skill in the art in possession of the present disclosure will recognize will be configured as an N port due to the switch device 208 operating as an NPIV gateway. With reference to FIG. 8A, in other embodiments of block 602 and following the switch device 208 being configured to operate as an NPIV gateway according to the method 400, a link 800 may be provided between the switch device 204 and the switch device 206. As such, at block 602, the switch engine 304 in the switch device 208 may identify the availability of the link 800 via a port in its communication system 308 that is connected to the link 800, which as discussed above will be configured as an N port due to the switch device 208 operating as an NPIV gateway.

Figure 7B:
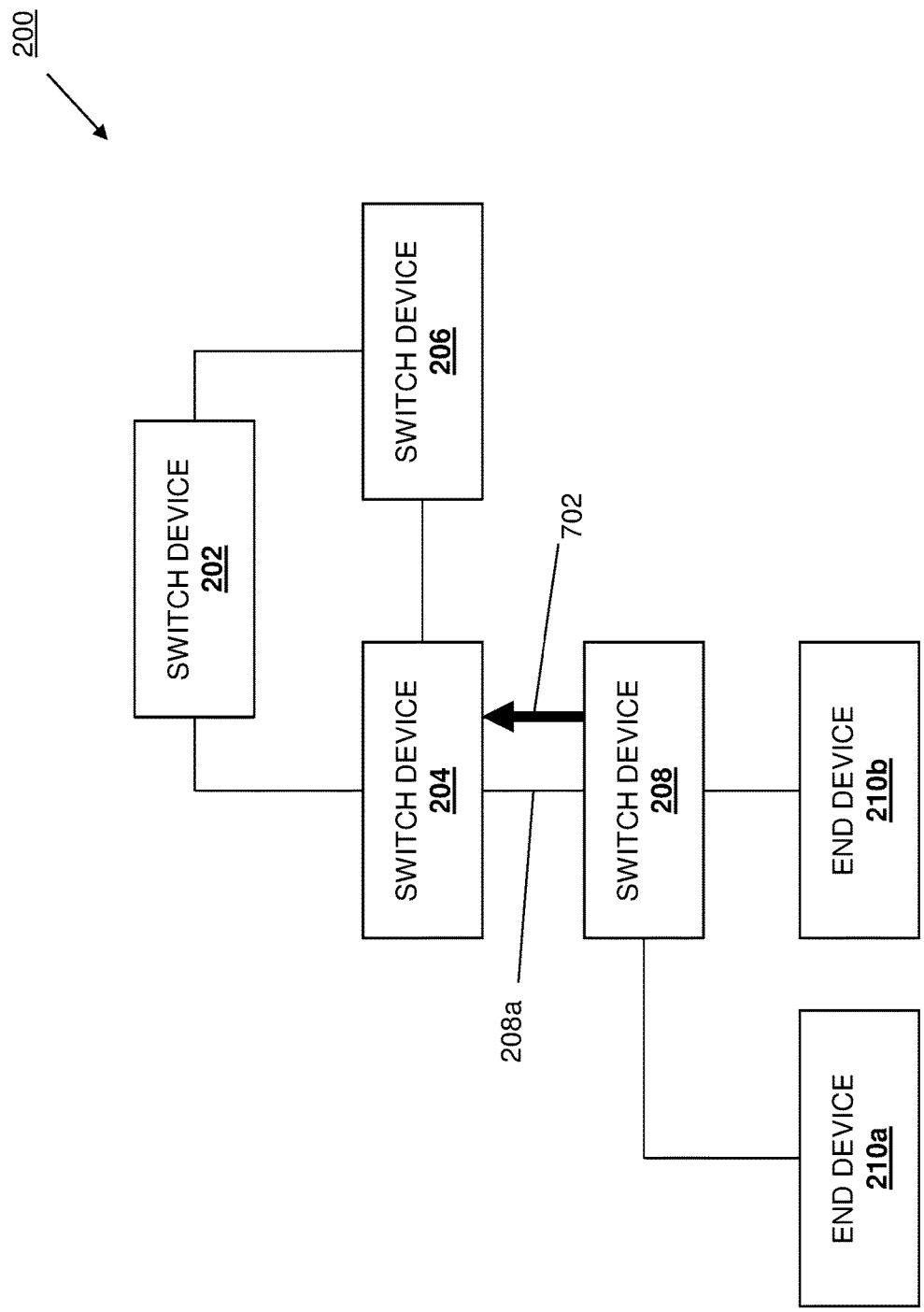
FIG. 7B is a schematic view illustrating an embodiment of the adaptive switch port role configuration system of FIG. 2 operating during the method of FIG. 6.
Figure 8B:
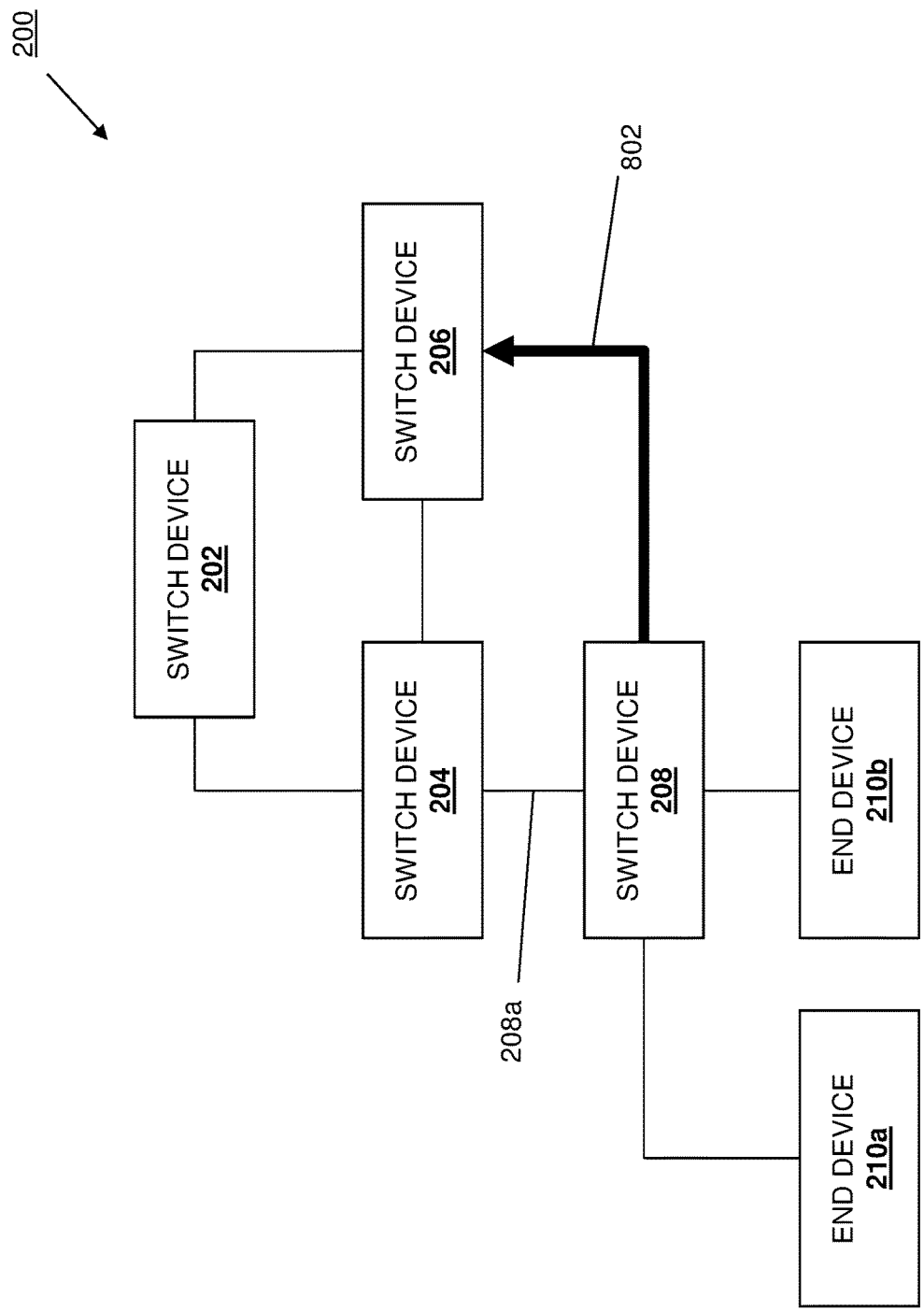
FIG. 8B is a schematic view illustrating an embodiment of the adaptive switch port role configuration system of FIG. 2 operating during the method of FIG. 6.

The method 600 then proceeds to block 604 where the first switch device transmits a FLOGI message for an N port connected to the second link. In an embodiment, at block 604 and in response to identifying the availability of a new link, the switch engine 304 in the switch device 204 will operate to generate and transmit a FLOGI message for the N port connected to that new link identified at block 602. Continuing with one of the examples started above with reference to FIG. 7A, and with reference to FIG. 7B, the switch engine 304 in the switch device 208 is illustrated as transmitting a FLOGI message 702 for the N port connected to the link 700 to the switch device 204 (e.g., via its communication system 308). As such, at block 602 in this example, the switch engine 304 in the switch device 204 may receive the FLOGI message 702 via its communication system 308. Similarly, continuing with another of the examples started above with reference to FIG. 8A, and with reference to FIG. 8B, the switch engine 304 in the switch device 208 is illustrated as transmitting a FLOGI message 802 for the N port connected to the link 800 to the switch device 206 (e.g., via its communication system 308). As such, at block 602 in this example, the switch engine 304 in the switch device 204 may receive the FLOGI message 802 via its communication system 308.

The method 600 then proceeds to decision block 606 where the first switch device determines whether a response to the FLOGI message has been received. In an embodiment, at decision block 606, the switch engine 304 in the switch device 208 may determine whether a response to the FLOGI message sent at block 604 has been received. As will be appreciated by one of skill in the art in possession of the present disclosure, switch devices receiving a FLOGI message may generate and transmit a response to those FLOGI messages, while end devices receiving a FLOGI message may not respond to that FLOGI message and, as such, at decision block 606, the switch engine 304 in the switch device 208 may perform a variety of operations to determine whether a response to the FLOGI message sent at block 604 has been received (e.g., setting a timer and monitoring whether a response to the FLOGI message is received within some time period, etc.)

If, at decision block 606, the first switch device determines that a response to the FLOGI message has not been received, the method 600 proceeds to block 608 where the first switch device reconfigures the port connected to the second link from an N port to an F port. In an embodiment, at block 608, the switch engine 304 in the switch device 208 may determine that a response to the FLOGI message sent at block 604 has not been received (e.g., the response to the FLOGI message has not been received in some time period, as discussed above) and, in response, may determine that an end device was connected via the new link (not illustrated). In response to determining that an end device has been connected to the switch device 208 via the new link, the switch engine 304 in the switch device 208/300 may operate to reconfigure the port in its communication system 308 that is connected to that new link from an N port to an F port. As will be appreciated by one of skill in the art in possession of the present disclosure, the reconfiguration of a port connected via the new link to an end device as an F port will allow that end device to communicate with the switch device 208.

Figure 7C:
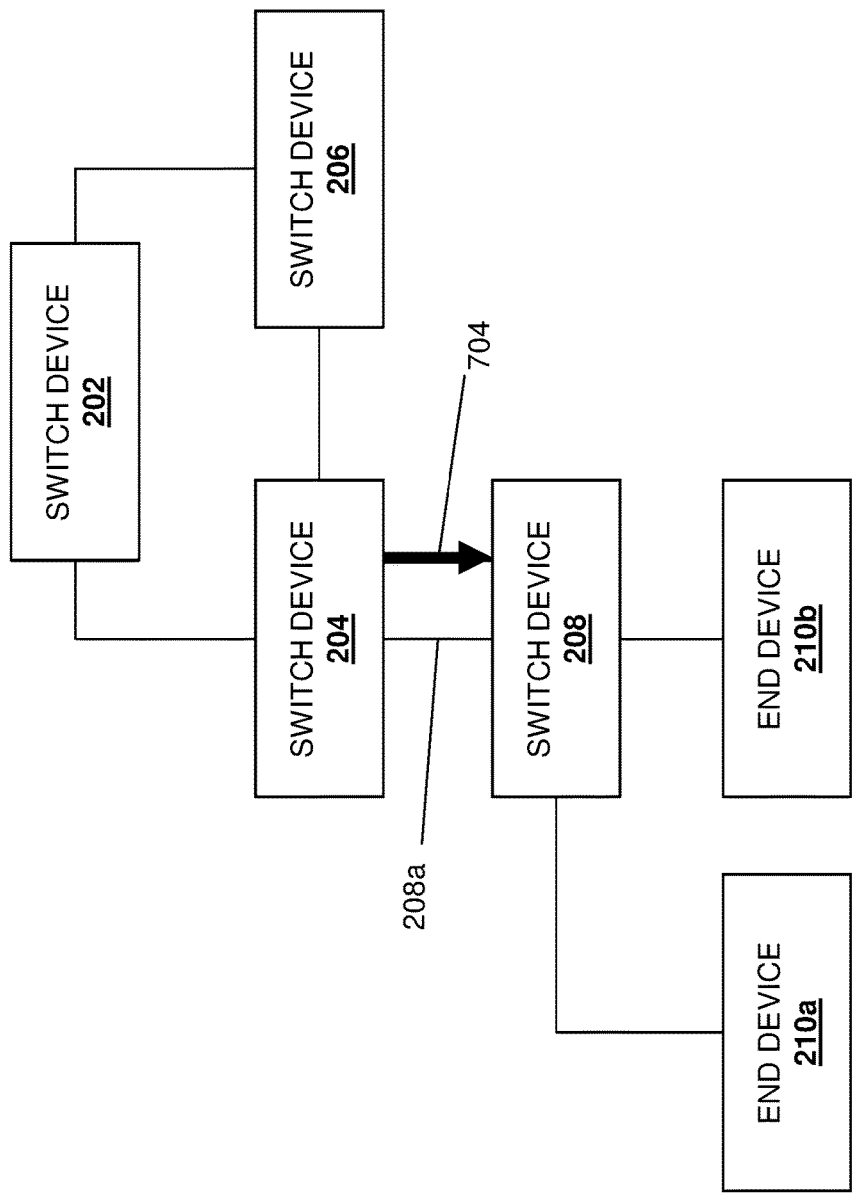
FIG. 7C is a schematic view illustrating an embodiment of the adaptive switch port role configuration system of FIG. 2 operating during the method of FIG. 6.
Figure 8C:
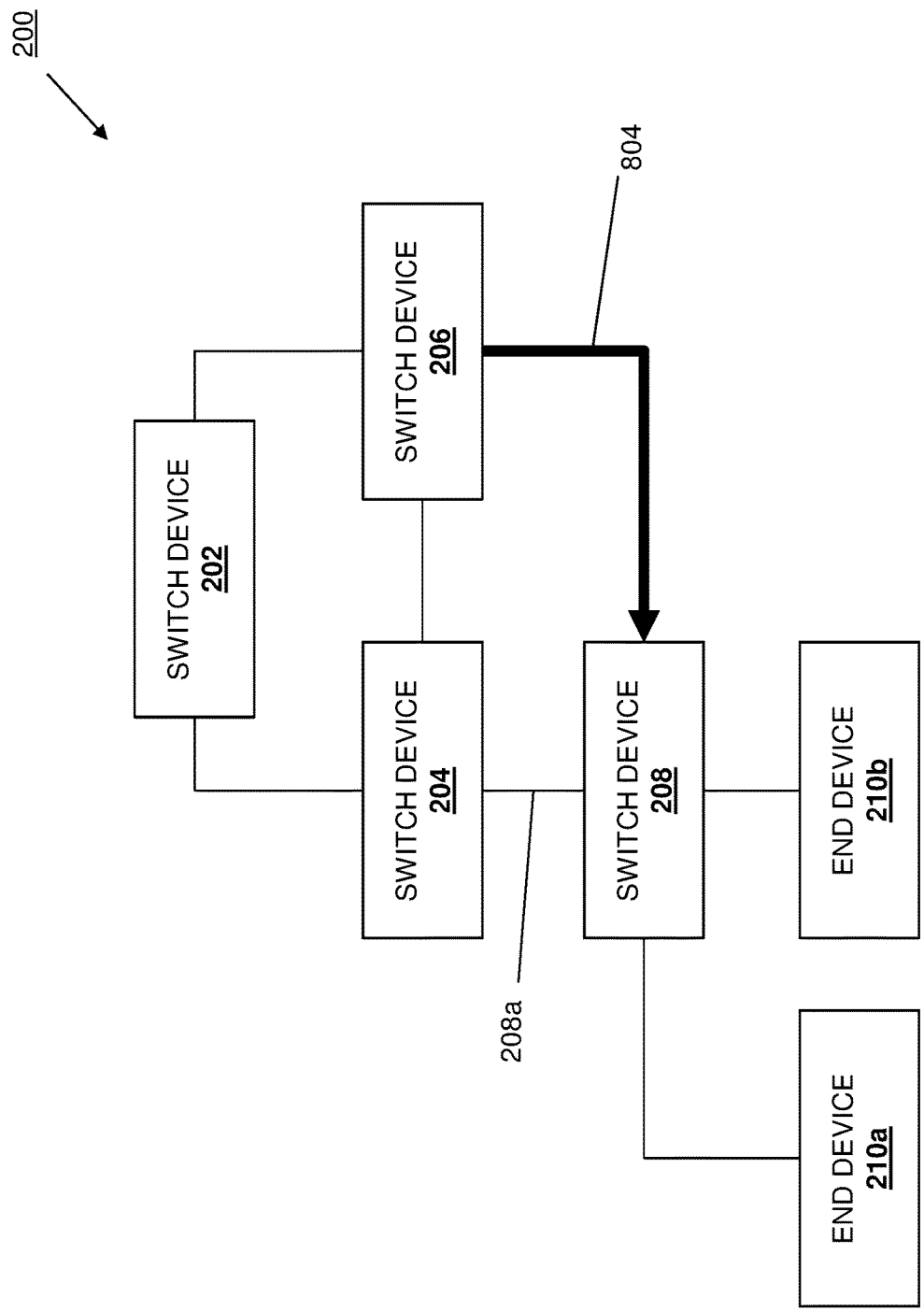
FIG. 8C is a schematic view illustrating an embodiment of the adaptive switch port role configuration system of FIG. 2 operating during the method of FIG. 6.

If, at decision block 606, the first switch device determines that a response to the FLOGI message has been received, the method 600 proceeds to decision block 610 where the first switch device determines whether the second link is connected to the second switch device. In an embodiment, at block 610, the switch engine 304 in the switch device 208 may determine that a response to the FLOGI message sent at block 604 has been received (e.g., the response to the FLOGI message has been received in some time period, as discussed above) and, in response, may determine that a switch device was connected via the new link and may determine an identity of that switch device. Continuing with one of the examples above, FIG. 7C illustrates the switch engine 304 in the switch device 204/300 generating and sending a FLOGI response 704 via its communication system 308 to the switch device 208. Similarly, continuing with another of the examples above, FIG. 8C illustrates the switch engine 304 in the switch device 206/300 generating and sending a FLOGI response 804 via its communication system 308 to the switch device 208.

In some embodiments, at decision block 610, the switch engine 304 in the switch device 208/300 may identity a WWN in the response to the FLOGI and determine whether or not that WWN is associated (e.g., in the switch database 306 included in the switch device 208/300) with the switch device 204 connected via the link 208a. As will be appreciated by one of skill in the art in possession of the present disclosure, during the fabric formation operations discussed above, the switch device 204 may have provided a WWN to the switch device 208, and thus a matching WWN in the response to the FLOGI received at decision block 606 will indicate that the new link is connected to that switch device 204. As such, at block 610 the switch engine 304 in the switch device 208/300 may receive the FLOGI response via its communication system, and determine whether a WWN in that FLOGI response matches the WWN associated with the switch device 204.

Figure 7D:
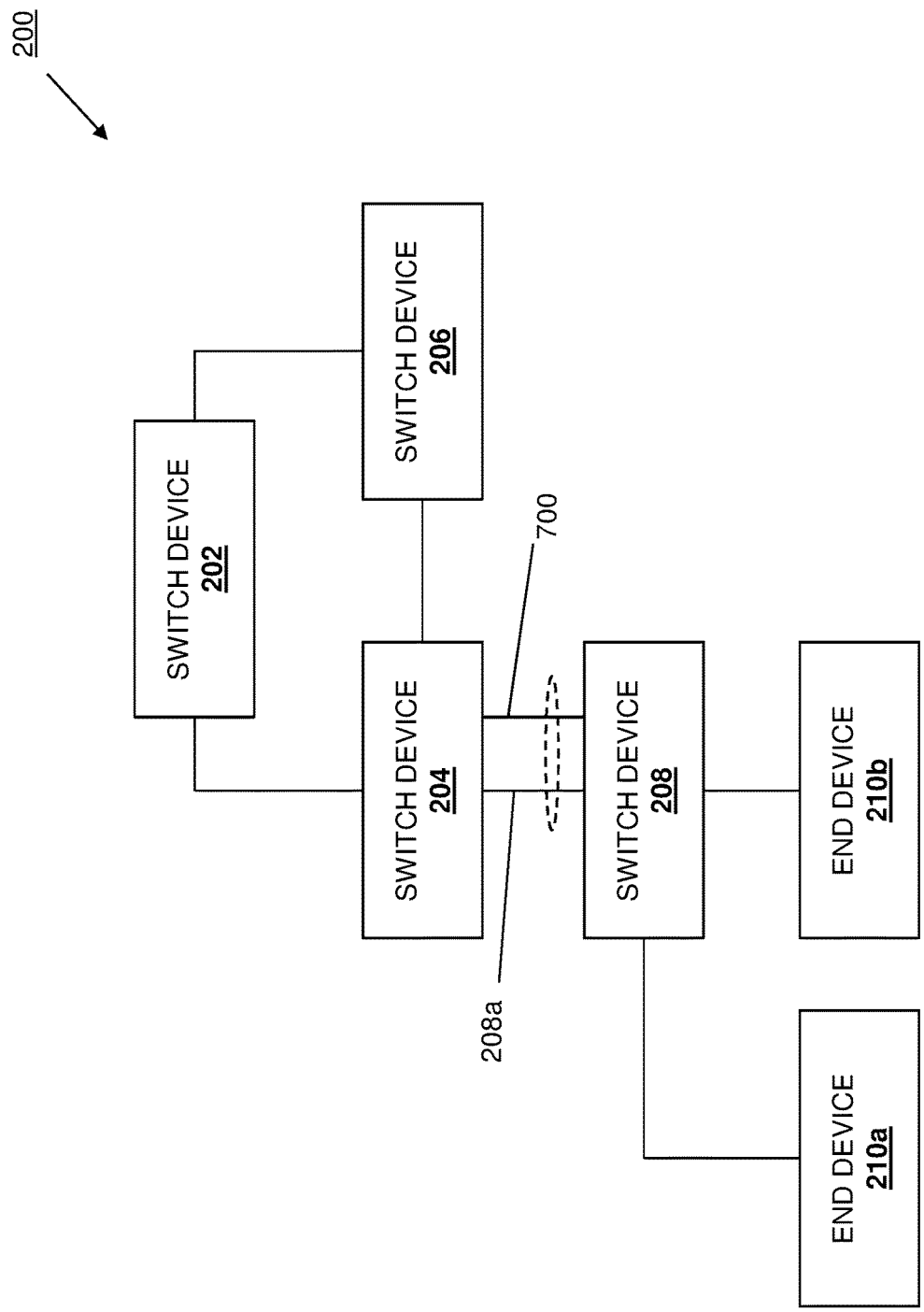
FIG. 7D is a schematic view illustrating an embodiment of the adaptive switch port role configuration system of FIG. 2 operating during the method of FIG. 6.

If, at decision block 610, the first switch device determines that the second link is connected to the second switch device, the method 600 proceeds to block 612 where the first switch device aggregates the second link with the first link. In an embodiment, at decision block 610, the switch engine 304 in the switch device 208/300 may have determined that a WWN in the FLOGI response 704 matched the WWN associated with the switch device 204 and, in response, operates to aggregate the link 700 with the link 208a, as illustrated by the dashed circle in FIG. 7D. For example, at block 612, the switch engine 304 in the switch device 208/300 may add the port that is included in its communication system 308 and that is connected to the link 700 to an existing N port trunk that includes the port that is included in its communication system 308 and that is connected to the link 208a.

If, at decision block 610, the first switch device determines that the second link is not connected to the second switch device, the method 600 proceeds to block 614 where the first switch device performs link reset operations and reconfigures the port connected to the second link from an N port to an E port. In an embodiment, at decision block 610, the switch engine 304 in the switch device 208/300 may have determined that a WWN in the FLOGI response 704 did not match the WWN associated with the switch device 204 and, in response, may determine that a new switch (e.g., the switch device 206) is connected to the switch device 208 via the link 800. In response to determining that the switch device 206 is connected to the switch device 208 via the link 800, the switch devices 206 and 208 may perform link reset operations for the link 800. For example, the switch engine 304 in the switch device 208/300 may perform link reset operations that include reconfiguring the port in its communication system 308 that is connected to the link 800 from an N port to an E port. As would be understood by one of skill in the art in possession of the present disclosure, the reconfiguration of a port from an N port to an E port may include the switch engine 304 resetting the link via a primitive sequence (e.g., in a Link Recovery State (LR), a Link Reset Response Sequence (LRR), an Offline Sequence (OLS), and a Not Operational Sequence (NOS), followed by an idle signal) and allowing a new port role to be assigned upon successful completion of ISL bring-up operations, and/or performing a variety of other actions known in the art. Furthermore, the switch engine 304 in the switch device 206/300 may perform link reset operations that include reconfiguring the port in its communication system 308 that is connected to the link 800 to an E port as well.

The method 600 then proceeds to decision block 616 where the first switch device attempts to verify a preferred domain identifier. In an embodiment of decision block 616, the switch engine 304 in the switch device 208/300 may determine whether a domain identifier was reserved by the switch device 208 at block 410 of the method 400. If, at decision block 616, the first switch device is able to verify the preferred domain identifier, the method 600 proceeds to block 618 where the first switch device completes zone merge operations. In an embodiment, at block 618 and in response to determining that the switch device 208 reserved the domain identifier at block 410 of the method 400, the switch engine 304 in the switch device 208/300 may operate to complete zone merge operations, which may include a variety of conventional zone merge operations that would be apparent to one of skill in the art and thus are not discussed herein in detail. As such, one of skill in the art in possession of the present disclosure will recognize that the reservation of a domain identifier by the switch device 208 during the method 400 will provide for non-disruptive N-port-to-E-port transitions in the switch device 208 during the method 600.

If, at decision block 616, the first switch device is unable to verify the preferred domain identifier, the method 600 proceeds to block 620 where the first switch device may either select a disruptive build fabric or isolate the E port connected to the new link. In an embodiment, at block 620 and in response to determining that the switch device 208 did not reserved the domain identifier at block 410 of the method 400, the switch engine 304 in the switch device 208/300 may select a disruptive build fabric, or may isolate the E port connected to the link 800, each of which may include a variety of conventional disruptive build fabric operations or E port isolation operations that would be apparent to one of skill in the art and thus are not discussed herein in detail. Following successful zone merge operations in either situation, all traffic may be routed through the new E port connected to the link 800, link reset operations may reconfigure the N port connected to the link 208a to E ports, and the switch engine 304 in the switch device 208/300 may remove any N port transition information from its switch database 306. As such, following blocks 618 or 620, the switch device 208 includes two ISLs (i.e., provided by the links 208a and 800), and thus no longer operates as a leaf switch.

Thus, systems and methods have been described that provide for the adaptive transitioning of roles for ports on an FC switch device in a manner that allows for the moving of routing and fabric functionality out of FC switch devices configured as leaf switches and to FC switch devices configured as core switches, which eliminates the need to perform costly ISL operations and ISL maintenance via E ports on FC switch devices operating a leaf switches. This may be accomplished by having a first FC switch device identify that it is configured as a leaf switch based on it being connected by a single ISL to a second FC switch device operating as a core switch and, in response, inform that second FC switch device about a transition of its E port connected to the ISL to an N port. In response the second FC switch device accepting the transition, the first and second FC switch devices will perform link reset operations that include the first FC switch device reconfiguring the E port to an N port and sending a FLOGI message to the second FC switch device for that N port. In response to receiving an acceptance to the FLOGI message from that second FC switch device, the first FC switch device sends an FDISC message for each of its connected end device and may receive back responses to the FDISC messages that include end device addresses for those end devices. The first FC switch device may then operate as an NPIV gateway using those end device addresses, which allows the switch fabric to view the end devices connected to the first FC switch device as being directly connected to the second FC switch device, which then may operate to perform routing and fabric functionality in place of the first FC switch device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An adaptive switch port role configuration system, comprising:
    a plurality of end devices;
    a first switch device; and
    a second switch device that is coupled to each of the plurality of end devices, and that includes a first port that is coupled to the first switch by a first Inter-Switch Link (ISL) and a second port, wherein the second switch device is configured to:
        transmit, to the first switch device via the first ISL while operating as a leaf switch with the first port configured as an Extender port (E port), a first port reconfiguration message;
        perform, in response to receiving a first acceptance of the first port reconfiguration message, link reset operations that include reconfiguring the first port as a Network port (N port);
        transmit, to the first switch device via the first ISL while the first port is configured as the N port, a first Fabric LOGIn (FLOGI) message for the first port configured as the N port;
        transmit, to the first switch device via the first ISL and in response to receiving a second acceptance of the first FLOGI message, a respective Fabric DISCovery (FDISC) message for each of the plurality of end devices;
        receive, for each FDISC message, an FDISC message response;
        operate, using end device addresses for each of the plurality of end devices included in the FDISC message responses, as an N_Port ID Virtualization (NPIV) gateway;
        determine, while operating as the NPIV gateway, that a second ISL has become available via the second port that is configured as the N port;
        transmit, via the second ISL, a second FLOGI message for the second port configured as the N port;
        receive a third acceptance of the second FLOGI message and, in response, determine that the third acceptance of the second FLOGI message was received from the first switch device; and
        aggregate, in response to receiving the third acceptance of the second FLOGI message from the first switch device, the second ISL and the first ISL.

2. The system of claim 1, wherein the second switch device is configured to:
  identify the first ISL as an only ISL connected to the second switch device and, in response, determine that the second switch device is configured as the leaf switch.

3. The system of claim 1, wherein the first port reconfiguration message is an Extended Link Service (ELS) message.

4. The system of claim 1, further comprising:
  a third switch device, wherein the second switch device includes a third port and is configured to:
    determine, while operating as the NPIV gateway, that a third ISL has become available via the third port that is configured as the N port;
    transmit, via the third ISL, a third FLOGI message for the third port configured as the N port;
    receive a fourth acceptance of the third FLOGI message and, in response, determine that the fourth acceptance of the third FLOGI message was received from the third switch device; and
    perform, in response to receiving the fourth acceptance of the third FLOGI message from the third switch device, link reset operations that include reconfiguring the third port as the E port.

5. The system of claim 4, wherein the second switch device is configured to:
  verify a domain identifier that was reserved using the first FLOGI message and, in response, complete zone merge operations.

6. An Information Handling System (IHS), comprising:
  a processing system; and
  a memory system that is coupled to the processing system and that includes instructions that, when executed by the processing system, cause the processing system to provide a switch engine that is configured to:
    transmit, to a first switch device via a first ISL that is coupled to the processing system while operating as a leaf switch with a first port that is coupled to the processing system configured as an Extender port (E port), a first port reconfiguration message;
    perform, in response to receiving a first acceptance of the first port reconfiguration message, link reset operations that include reconfiguring the first port as a Network port (N port);
    transmit, to the first switch device via the first ISL while the first port is configured as the N port, a first Fabric LOGIn (FLOGI) message for the first port configured as the N port;
    transmit, to the first switch device via the first ISL and in response to receiving a second acceptance of the first FLOGI message, a respective Fabric DISCovery (FDISC) message for each of a plurality of end devices that are coupled to the processing system;
    receive, for each FDISC message, an FDISC message response;
    operate, using end device addresses for each of the plurality of end devices included in the FDISC message responses, as an N_Port ID Virtualization (NPIV) gateway;
    determine, while operating as the NPIV gateway, that a second ISL has become available via a second port that is coupled to the processing system and configured as the N port;
    transmit, via the second ISL, a second FLOGI message for the second port configured as the N port;
    receive a third acceptance of the second FLOGI message from a second switch device and, in response, determine that the third acceptance of the second FLOGI message was received from the second switch device; and
    perform, in response to receiving the third acceptance of the second FLOGI message from the second switch device, link reset operations that include reconfiguring the second port as the E port.

7. The IHS of claim 6, wherein the switch engine is configured to:
  identify the first ISL as an only ISL that is coupled to the processing system and, in response, determine that the IHS is configured as the leaf switch.

8. The IHS of claim 6, wherein the first port reconfiguration message is an Extended Link Service (ELS) message.

9. The IHS of claim 6, wherein the switch engine is configured to:
  determine, while operating as the NPIV gateway, that a third ISL has become available via a third port that is coupled to the processing system and configured as the N port;
  transmit, via the third ISL, a third FLOGI message for the third port configured as the N port;
  receive a fourth acceptance of the third FLOGI message and, in response, determine that the fourth acceptance of the third FLOGI message was received from the first switch device; and
  aggregate, in response to receiving the fourth acceptance of the third FLOGI message from the first switch device, the third ISL and the first ISL.

10. The IHS of claim 6, wherein the switch engine is configured to:
  verify a domain identifier that was reserved using the first FLOGI message and, in response, complete zone merge operations.

11. The IHS of claim 6, wherein the switch engine is configured to:
  determine that a domain identifier cannot be verified and, in response, either select a disruptive build fabric or isolate the second port configured as the E port.

12. A method for adaptively configuration switch port roles, comprising:
  transmitting, by a first switch device to a second switch device via a first ISL while operating as a leaf switch with a first port configured as an Extender port (E port), a first port reconfiguration message;
  performing, by the first switch device in response to receiving a first acceptance of the first port reconfiguration message, link reset operations that include reconfiguring the first port as a Network port (N port);
  transmitting, by the first switch device to the second switch device via the first ISL while the first port is configured as the N port, a first Fabric LOGIn (FLOGI) message for the first port configured as the N port;
  transmitting, by the first switch device to the second switch device via the first ISL and in response to receiving a second acceptance of the first FLOGI message, a respective Fabric DISCovery (FDISC) message for each of a plurality of end devices that are coupled to the first switch device;
  receiving, by the first switch device for each FDISC message, an FDISC message response;

operating, by the first switch device using end device addresses for each of the plurality of end devices included in the FDISC message responses, as an N_Port ID Virtualization (NPIV) gateway;

determining, by the first switch device while operating as the NPIV gateway, that a second ISL has become available via a second port configured as the N port;

transmitting, by the first switch device via the second ISL, a second FLOGI message for the second port configured as the N port;

receiving, by the first switch device, a third acceptance of the second FLOGI message from the second switch device and, in response, determine that the third acceptance of the second FLOGI message was received from the second switch device; and aggregating, by the first switch device in response to receiving the third acceptance of the second FLOGI message from the second switch device, the second ISL and the first ISL.

13. The method of claim 12, further comprising:
identifying, by the first switch device, the first ISL as an only ISL that is coupled to the first switch device and, in response, determine that the first switch device is configured as the leaf switch.

14. The method of claim 12, wherein the first port reconfiguration message is an Extended Link Service (ELS) message.

15. The method of claim 12, further comprising:
determining, by the first switch device while operating as the NPIV gateway, that a third ISL has become available via a third port configured as the N port;

transmitting, by the first switch device via the third ISL, a third FLOGI message for the third port configured as the N port;

receiving, by the first switch device, a fourth acceptance of the third FLOGI message and, in response, determining that the fourth acceptance of the third FLOGI message was received from a third switch device; and performing, by the first switch device in response to receiving the fourth acceptance of the third FLOGI message from the third switch device, link reset operations that include reconfiguring the third port as the E port.

16. The method of claim 15, further comprising:
verifying, by the first switch device, a domain identifier that was reserved using the first FLOGI message and, in response, completing zone merge operations.

17. The method of claim 12, further comprising:
determining, by the first switch device, that a domain identifier cannot be verified and, in response, either selecting a disruptive build fabric or isolating the second port configured as the E port.

* * * * *